United States Patent
Parrish

(10) Patent No.: US 10,015,975 B2
(45) Date of Patent: Jul. 10, 2018

(54) SMOKER HAVING INTERNAL PERFORATED SMOKE STACK

(71) Applicant: The Brinkmann Corporation, Dallas, TX (US)

(72) Inventor: Daniel Parrish, Dallas, TX (US)

(*) Notice: Subject to any disclaimer, the term of this patent is extended or adjusted under 35 U.S.C. 154(b) by 0 days.

(21) Appl. No.: 14/491,779

(22) Filed: Sep. 19, 2014

(65) Prior Publication Data
US 2015/0079251 A1 Mar. 19, 2015

Related U.S. Application Data

(60) Provisional application No. 61/880,064, filed on Sep. 19, 2013.

(51) Int. Cl.
*A23B 4/044* (2006.01)
*A23B 4/052* (2006.01)
*A47J 37/04* (2006.01)
*A47J 37/07* (2006.01)

(52) U.S. Cl.
CPC .......... *A23B 4/052* (2013.01); *A23B 4/044* (2013.01); *A23B 4/0523* (2013.01); *A47J 37/049* (2013.01); *A47J 37/0763* (2013.01); *A47J 2037/0795* (2013.01)

(58) Field of Classification Search
CPC ....... A23B 4/044–4/0526; A47J 37/049; A47J 37/07–37/2037; A47J 43/18
USPC ........ 426/314–315; 99/419–421 V, 473–475, 99/482–483
See application file for complete search history.

(56) References Cited

U.S. PATENT DOCUMENTS

| | | | |
|---|---|---|---|
| 657,877 A * | 9/1900 | Kirby | |
| 1,384,250 A * | 7/1921 | Froom | A47J 33/00 126/30 |
| 2,040,676 A * | 5/1936 | Stevens | A47J 37/0611 126/211 |
| 2,246,804 A * | 6/1941 | Lipschutz | A23B 4/052 126/59.5 |
| 2,611,311 A * | 9/1952 | Irwin | A23B 4/052 126/215 |
| 3,112,716 A * | 12/1963 | Knight | A47J 37/079 126/168 |
| 3,116,704 A * | 1/1964 | Byars, Sr. | A47J 37/079 126/162 |
| 3,167,040 A * | 1/1965 | Byars, Sr. | A47J 37/079 126/162 |
| 3,450,123 A * | 6/1969 | Tidd | A47J 36/26 126/25 R |
| 3,884,214 A * | 5/1975 | Duncan | A47J 37/079 126/25 B |
| 4,282,854 A * | 8/1981 | Byars | A47J 37/079 126/25 B |
| 4,551,338 A * | 11/1985 | Wallace | A22C 17/0053 426/281 |

(Continued)

*Primary Examiner* — Drew E Becker

(57) ABSTRACT

A smoker having an internal perforated smoke stack that is able to smoke food from both the inside and outside. Food is placed inside the smoker and positioned on the perforated smoke stack. The perforated smoke stack is directly connected to the charcoal pan such that smoke enters the perforated smoke stack and out the perforations, thereby providing heat and smoke to the inside of the food in addition to the heat and smoke permeating the smoker's body chamber outside the food.

9 Claims, 13 Drawing Sheets

(56) References Cited

U.S. PATENT DOCUMENTS

| | | | | |
|---|---|---|---|---|
| 4,869,163 A * | 9/1989 | Haskins | A23B 4/048 | 126/163 R |
| 4,934,260 A * | 6/1990 | Blevins | A23B 4/052 | 126/21 A |
| 5,048,406 A * | 9/1991 | Cofer | A23B 4/044 | 126/25 R |
| 5,070,777 A * | 12/1991 | Novak | A47J 37/0786 | 126/25 R |
| 5,138,939 A * | 8/1992 | Bradley | A23B 4/048 | 126/59.5 |
| 5,285,770 A * | 2/1994 | Kim | A47J 37/079 | 126/163 R |
| 6,019,035 A * | 2/2000 | Jonas | A23B 4/052 | 126/25 R |
| 6,062,131 A * | 5/2000 | Holland | A47J 43/18 | 99/345 |
| 6,125,739 A * | 10/2000 | Jernigan | A47J 43/18 | 99/345 |
| 6,427,582 B1 * | 8/2002 | Measom | A47J 27/00 | 99/342 |
| 6,502,501 B1 * | 1/2003 | Simon | A47J 27/04 | 99/345 |
| 6,502,503 B1 * | 1/2003 | Bell, Jr. | A47J 36/16 | 99/345 |
| 6,575,082 B1 * | 6/2003 | Liao | A47J 27/04 | 99/340 |
| 2002/0112716 A1 * | 8/2002 | Liu | A23B 4/052 | 126/25 R |
| 2004/0187699 A1 * | 9/2004 | Citrynell | A47J 43/18 | 99/345 |
| 2006/0137543 A1 * | 6/2006 | McLemore | A23B 4/052 | 99/482 |
| 2008/0041359 A1 * | 2/2008 | Kim | A47J 37/0718 | 126/25 R |
| 2011/0226135 A1 * | 9/2011 | Oswald | A47J 27/04 | 99/419 |
| 2014/0261015 A1 * | 9/2014 | Nelson | A23B 4/052 | 99/467 |
| 2014/0299005 A1 * | 10/2014 | Vinett | A23B 4/052 | 99/482 |
| 2014/0377431 A1 * | 12/2014 | Kazerouni | A47J 37/043 | 426/523 |
| 2015/0201632 A1 * | 7/2015 | Ferber | A23B 4/052 | 454/3 |

* cited by examiner

SMOKER HAVING INTERNAL PERFORATED SMOKE STACK

CROSS-REFERENCE TO RELATED APPLICATION

The present application claims priority to U.S. Provisional Application No. 61/880,064 entitled "SMOKER HAVING INTERNAL PERFORATED SMOKE STACK," filed on Sep. 19, 2013, the entire contents of which are herein incorporated by reference as if fully set forth herein.

TECHNICAL FIELD

This invention relates to the field of food smokers.

BACKGROUND

Smoking has been used to prepare various types of meat to enhance flavor and for its preservative benefits. Smoking methods have involved exposing the given meat item to smoke, and often heat, for a period of time. The smoke used to cook, flavor and/or preserve meat is often generated by burning wood (e.g., hickory, mesquite, oak, pecan, alder, and maple) or charcoal.

Smoking methods have been performed outdoors, within naturally occurring structures, as well as within various types of man-made smokers. Examples of smokers range from enclosures the size of buildings (commonly referred to as a smokehouse) to relatively small containers constructed from various materials including metal, ceramics, and clay.

For efficiency and effectiveness, it would be desirable to expose as much of the surface area of the given meat to smoke. For items such as poultry, for example, this would include both the exterior and interior surfaces. Potential benefits from exposing both the exterior and the interior surfaces of the given meat item to smoke during the smoking process include increased rate of smoke penetration, more intense smoke flavor, as well as added preservative benefits with respect to the interior surfaces of the given meat item.

The present invention addresses this need and other concerns.

SUMMARY OF THE INVENTION

The present invention may be embodied in a smoker comprising a combustion chamber configured to hold a fuel element; a substantially enclosed cooking chamber that is heated by the combustion chamber; and a perforated smoke stack in direct communication with the combustion chamber so as to be able to receive heat emanated from the combustion chamber, the perforated smoke stack having a plurality of perforations and shaped to be inserted into a food item. In one aspect of this embodiment, the fuel element may be a solid fuel element such as charcoal or wood, and the perforated smoke stack, which is in communication with the combustion chamber, receives smoke emanating from the heating element chamber. In accordance with an aspect of the present invention, the combustion chamber may have an opening, and the perforated smoke stack may be hollow with at least one open end. The open end of the perforated smoke stack may be in communication with the opening in the combustion chamber.

The present invention may also be embodied in a method for heating food in a smoker, as described above. The method comprises inserting the perforated smoke stack into a food item; positioning the perforated smoke stack and the food item within the cooking chamber such that the perforated smoke stack is in direct communication with the combustion chamber; and igniting a fuel element inside the combustion chamber to create heat, the step of igniting the fuel element inside the combustion chamber causing the inside of the food item to be heated by heat emanating from the plurality of perforations in the perforated smoke stack. In one aspect of this embodiment, the fuel element may be a solid fuel element such as charcoal or wood, and igniting the solid fuel element results in smoking of the inside of the food item using smoke emanating from the plurality of perforations in the perforated smoke stack.

BRIEF DESCRIPTION OF THE DRAWINGS

Embodiments of the present invention will now be described, by way of example only, with reference to the following drawings.

DETAILED DESCRIPTION

In the following description, numerous specific details are set forth to provide a thorough understanding of various embodiments of the present invention. It will be apparent however, to one skilled in the art that these specific details need not be employed to practice various embodiments of the present invention. In other instances, well known components or methods have not been described in detail to avoid unnecessarily obscuring various embodiments of the present invention.

Figure 1:
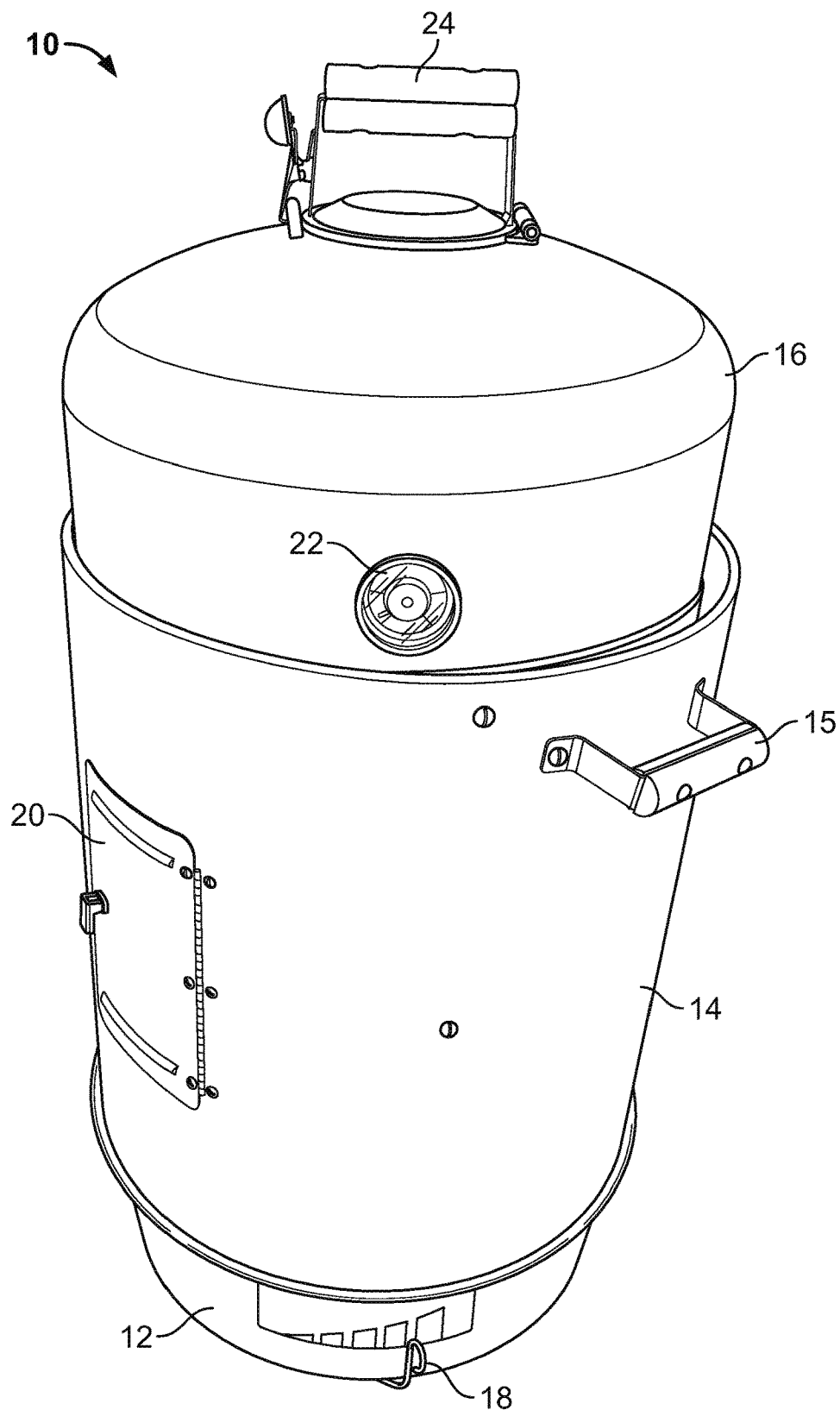
FIG. 1 is a perspective view of a smoker in accordance with an embodiment of the present invention.

FIG. 1 provides an external perspective view of a smoker 10 in accordance with an embodiment of the present invention. The smoker 10 has a base 12, a body 14, and a lid 16. The base 12 includes an airflow control handle 18 that allows a user to control the airflow into the smoker, and, thereby, control, to a degree, the temperature in the smoker.

The body 14 has two handles 15 that allow for a user to easily pick up the body, and a door 20 that allows the user to access food cooking within the smoker 10. The door 20 may be used to check on the doneness of the food, or to baste the food, or apply any sauces or seasonings that the user may wish to apply during the cooking process. The lid 16 includes a temperature indicator 22 and a smoke release cap 24 that may be used to control the amount of smoke that builds up in the smoker 10. Each of these components as well as the internal components of the smoker 10 will be discussed in greater detail in the following figures.

Figure 2:
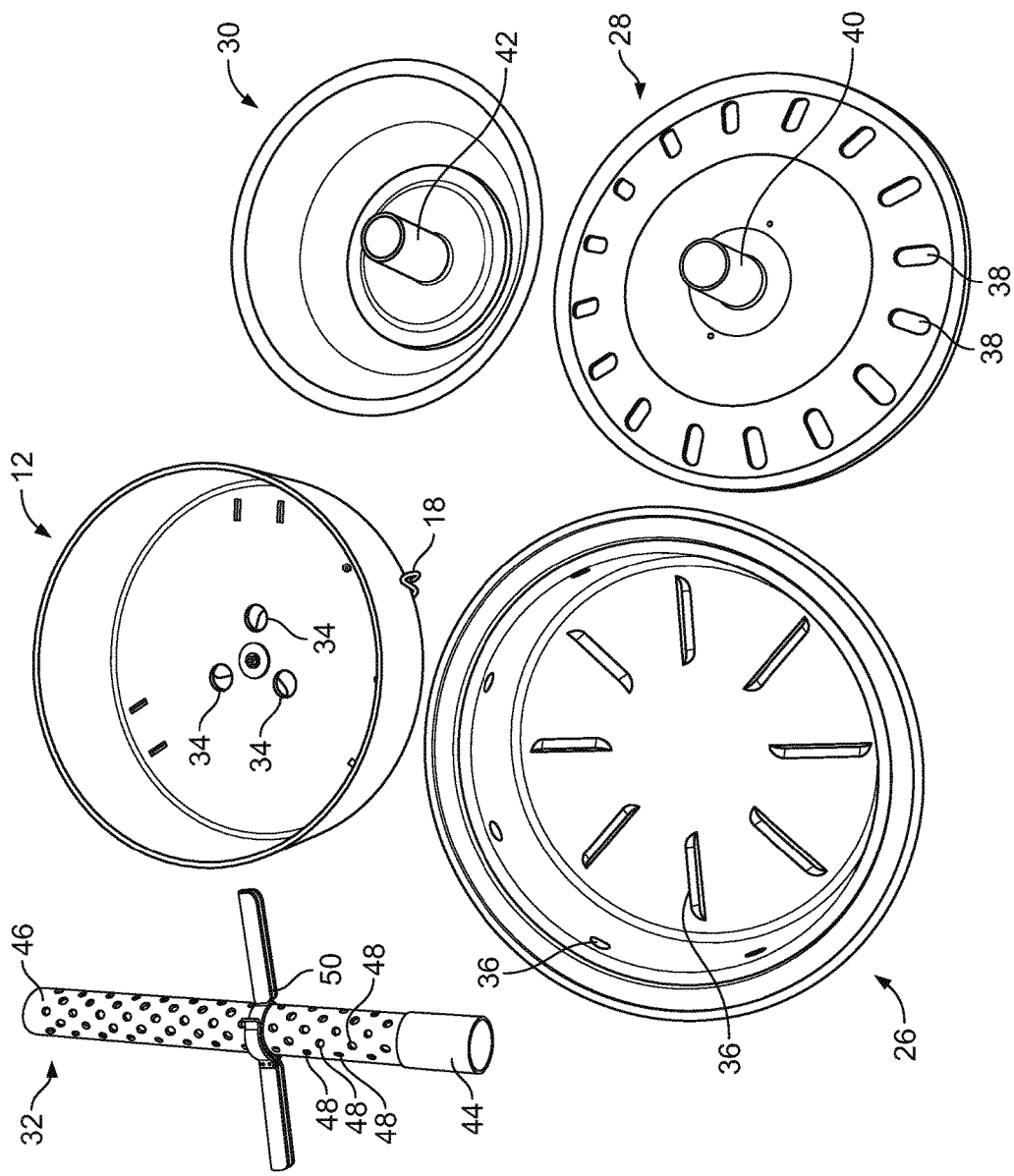
FIG. 2 is a disassembled view of the base components of the smoker of FIG. 1.

FIG. 2 is a disassembled view of the internal components of the smoker 10. First, there is the base 12, which has the airflow control handle 18 and airflow vents 34. The airflow control handle 18 rotates a cover underneath the airflow vents 34 to allow more or less air to enter the smoker, thereby controlling the temperature of the smoker. A charcoal pan 26 is configured to be positioned within the base 12. While this disclosure will refer to this component as a "charcoal" pan and refer to charcoal as the heating and smoking element, it will be understood that other aromatic heat sources may be used, such as burning wood or herbs or any combination of these things. The charcoal pan 26 has openings 36 on its side wall and floor so as to allow air from the airflow vents 34 to reach the coals. A charcoal pan cover 28 is configured to be placed on top of the charcoal pan 26. The charcoal pan cover 28 has openings 38 that allow for smoke from the coals to enter into the body of the smoker 10. Additionally, the charcoal pan cover 28 has a smoke stack support 40, which is tubular extension extending upwardly from the charcoal pan cover's top surface. A water pan 30 is configured to be positioned on the charcoal pan cover 28. Water in the water pan 30 helps to regulate the temperature in the smoker and also helps to keep food moist while cooking. The water pan 30 has its own smoke stack support 42, and is positioned on the charcoal pan cover 28 by positioning the water pan smoke stack support 42 over the charcoal pan cover 28's smoke stack support 40. A close-up view of this configuration is provided in FIG. 6. Finally, there is also shown in FIG. 2 a perforated smoke stack 32. The perforated smoke stack 32 is configured to be positioned over the smoke stack supports 40, 42 via a bottom opening 44. The perforated smoke stack 32 has a top opening 46 and plurality of perforations 48. Attached to the perforated smoke stack 32 is an adjustable support 50. The position of the adjustable support 50 can be adjusted along the perforated smoke stack 32 using the perforations 48. This will be discussed in greater detail in discussing FIGS. 7-8.

Figure 3A:
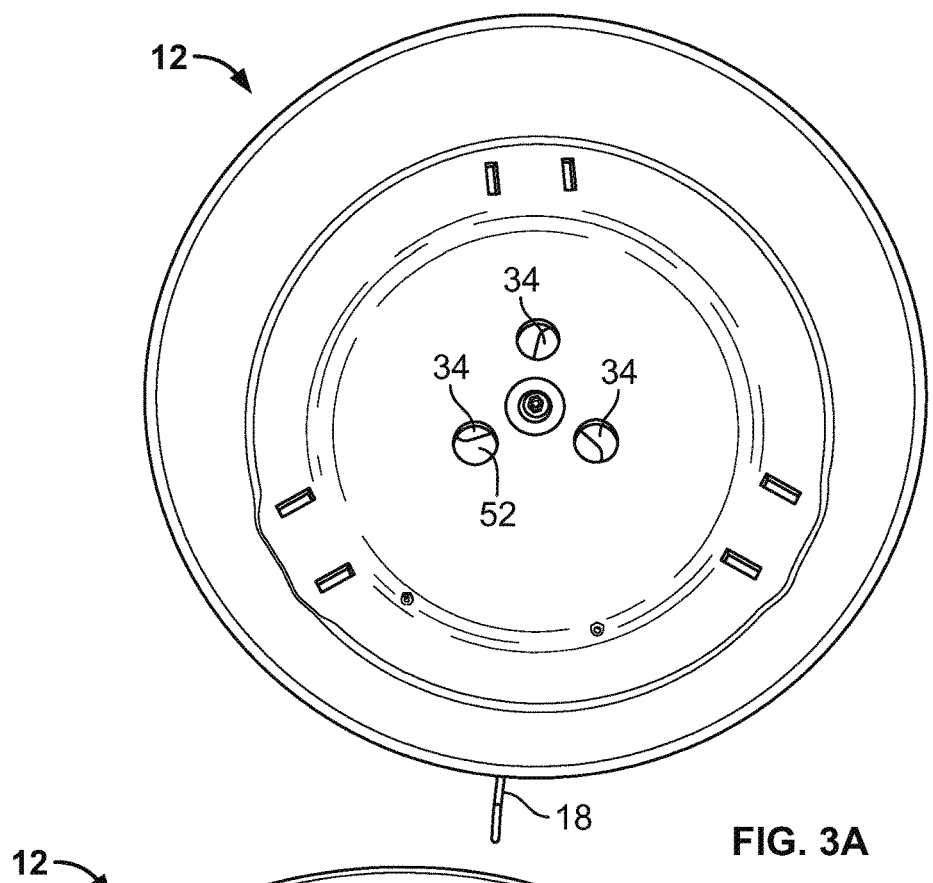
FIGS. 3A-B are a top-down view of the inside of a smoker base and a bottom view of the smoker base, in accordance with an aspect of an embodiment of the present invention.
Figure 3B:
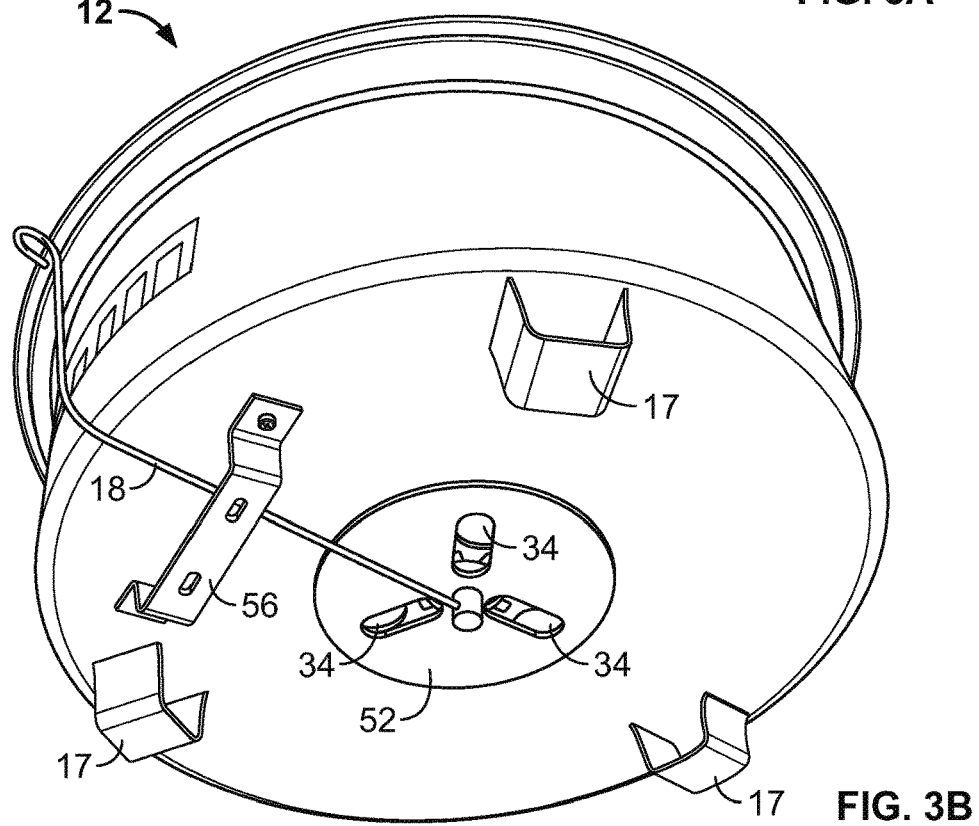
Figure 4:
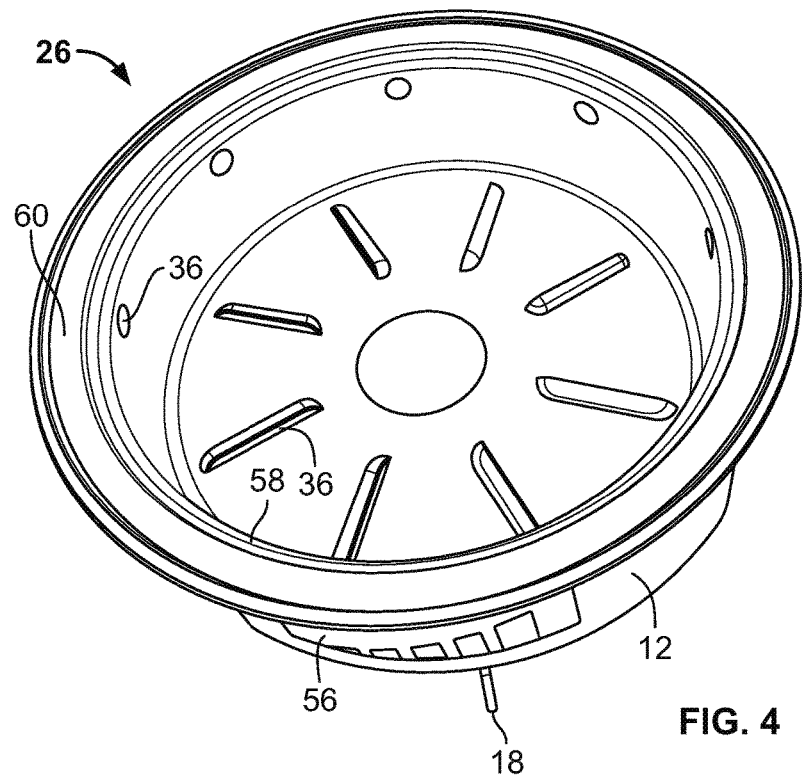
FIG. 4 is a top down view of a charcoal pan placed inside the smoker base of FIG. 3.

FIGS. 3A-3B provide close-up views of the interior and bottom of the base 12, respectively. In FIG. 3A, the airflow cover 52 can be seen partially covering the airflow vents 34. The airflow cover 52 is rotated using airflow control handle 18 to adjust the amount of air that is able to enter the smoker 10, thereby controlling how hot the coals in the charcoal burner will burn. FIG. 3B shows a bottom view of the base 12 and more clearly shows the airflow cover 52, the airflow control handle 18, the airflow vents 34 and feet 17. In the figure, the three openings on the airflow cover 52 are nearly aligned with the three airflow vents 34. When fully aligned, there is maximum airflow into the smoker, which results in hotter coals. As the handle 18 is turned in the counter-clockwise direction, the airflow cover will cover more and more of the airflow vents 34, resulting in less airflow and cooler coals. A handle guide 56 prevents the handle 18 from rotating beyond the closed and open positions. This provides a convenience for the user so that the user will know that when the handle is pushed all the way in one direction, the airflow vents 34 are fully open, and when the handle is pushed in the other direction, the vents 34 are fully closed. In this way, the user can position the handle 18 is the appropriate position without being able to see the airflow vents 34 or vent cover 52, which, because they are on the bottom of the smoker 10, are not visible to the user. In FIG. 4, it can be seen that there is a heat indicator 56 on the base 12, which instructs the user as to which direction the handle 18 should be turned to increase or decrease the temperature inside the smoker 10 (i.e., increase or decrease airflow into the smoker).

Figure 5:
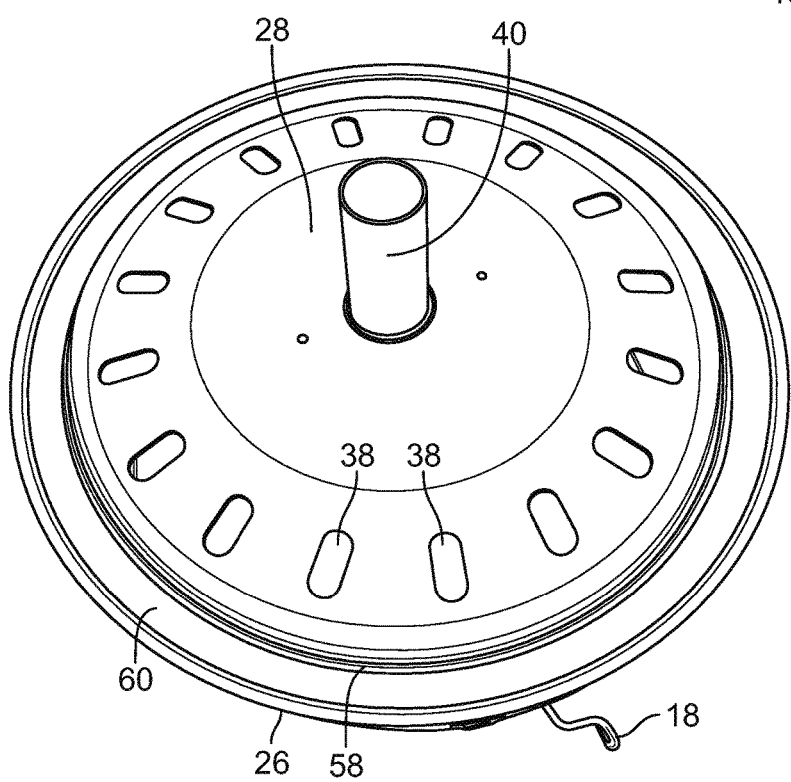
FIG. 5 is a top down view of the charcoal pan of FIG. 4 covered in a charcoal pan cover having a smoke stack support, in accordance with an aspect of an embodiment of the present invention.

In FIG. 4, a charcoal pan 26 has been inserted into the base 12. Coals are placed into the charcoal pan 26 to heat the smoker 10. As stated above, the charcoal pan 26 has openings 36 on its wall and floor to allow air into charcoal pan to provide oxygen for the burning coals. The charcoal pan 26 has an inner rim 58 to receive a charcoal pan cover 28, and an outer rim 60 to receive the smoker body 12. In FIG. 5, the charcoal pan cover 28 has been placed on top of the charcoal pan 26, and is held in place by the inner rim 58. Openings 38 on the charcoal pan cover 28 allow smoke to escape the charcoal pan 26 into the smoker body, and the smoke stack support 40 both supports the perforated smoke stack 32 and funnels smoke into the perforated smoke stack 32. Openings 38 can be configured so that they allow less smoke to pass directly into the smoker body than that allowed to funnel into the perforated smoke stack (e.g., only 20% of the smoke could be allowed to pass through openings 38 compared to 80% of the smoke funneling into the perforated smoke stack).

Figure 6:
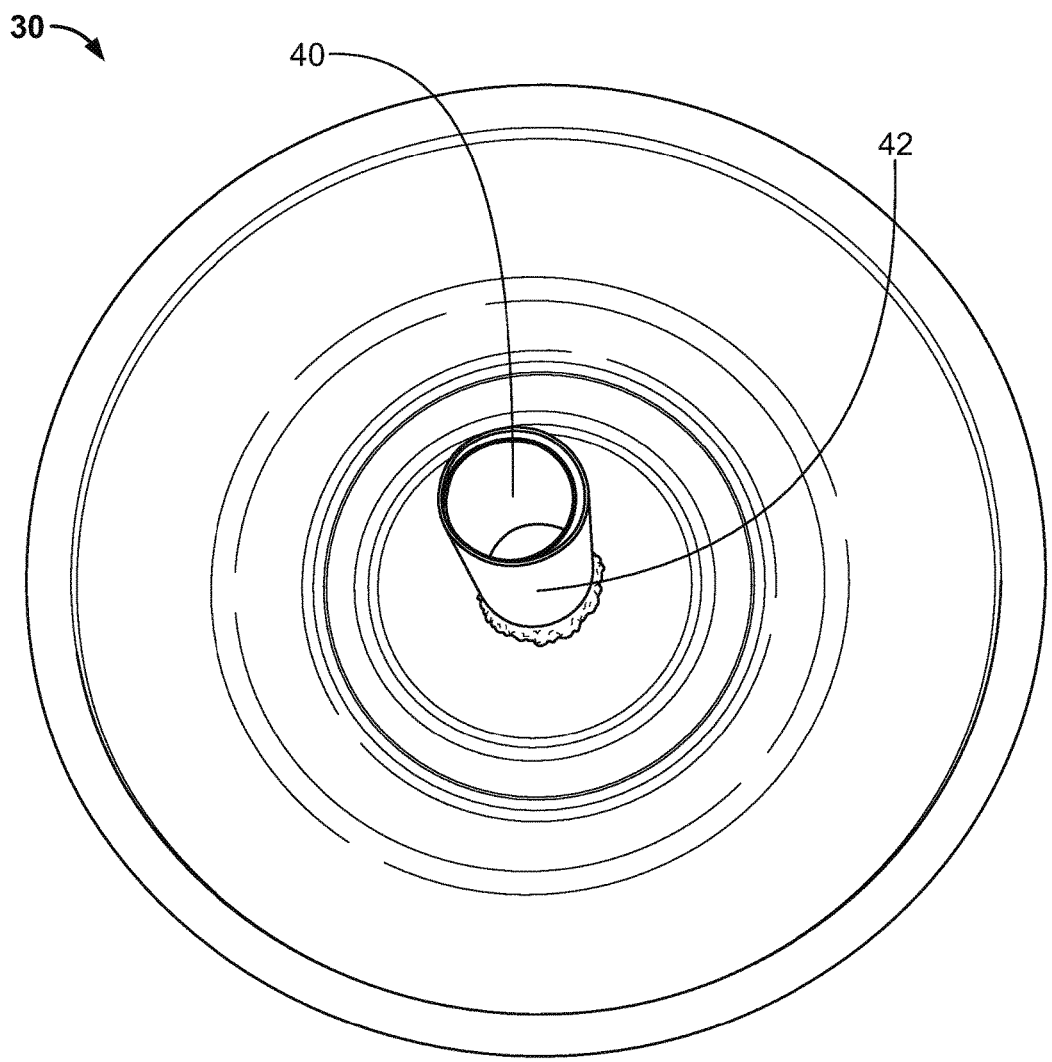
FIG. 6 is a close up view of a water pan positioned over the charcoal pan cover of FIG. 5.

In FIG. 6, a water pan 30 has been placed on top of the charcoal pan cover 28. The water pan 30 is generally bowl-like in shape so that it can hold water, with another smoke stack support 42 in the center. The water pan's smoke stack support 42 is placed over the charcoal pan cover's smoke stack support 40. This holds the water pan in place, provides a support for the perforated smoke stack 32, and also provides a path for smoke to escape the charcoal pan 26 into the perforated smoke stack 32.

Figure 7A:
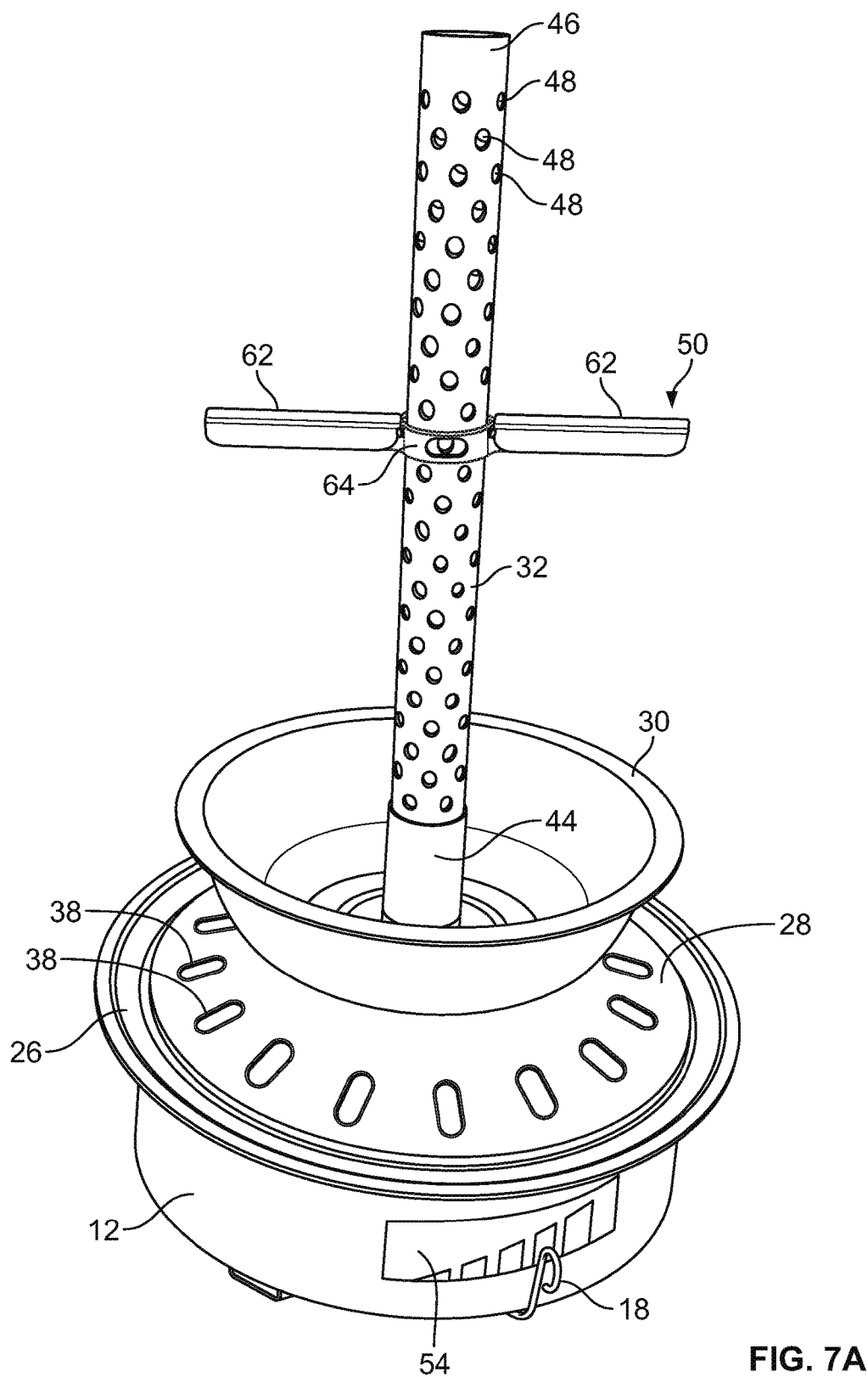
FIGS. 7A-B are perspective views of a smoker base assembly with a perforated smoke stack, in accordance with an aspect of an embodiment of the present invention.
Figure 7B:
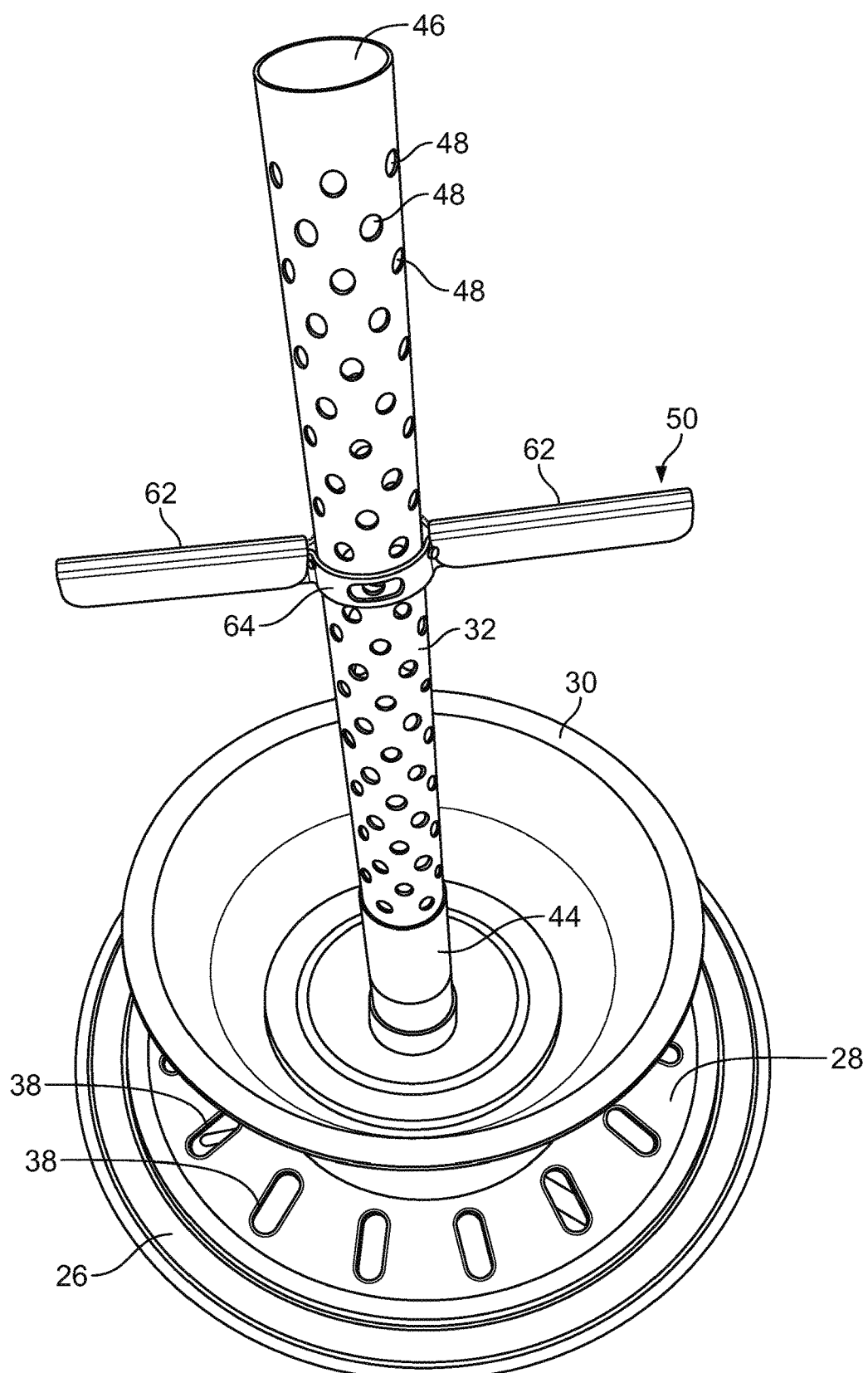

FIGS. 7A-B show the perforated smoke stack 32 positioned on the water pan 30. The perforated smoke stack's bottom opening 44 has been placed over the smoke stack supports 40, 42. Food may be positioned over the top of the perforated smoke stack 32 and supported by the adjustable support 50. The adjustable support 50 includes an anchor portion 64 and two support handles 62.

For example, when cooking poultry, such as a chicken, the perforated smoke stack 32 may be placed through the chicken's cavity opening so that the perforated smoke stack 32 is positioned within the chicken's cavity, with the chicken resting on the support handles 62 of the adjustable support 50. In this position, the chicken is smoked from both the inside and outside simultaneously. Smoke and heat enter the main body chamber via the charcoal pan cover openings 38 to cook the chicken from the outside. Simultaneously, smoke travels from the charcoal pan 26 up through the smoke stack supports 40, 42 and into the perforated smoke stack 32, and is released through the perforations 48. With the perforated smoke stack 32 is positioned within the chicken's cavity, the perforations positioned within the chicken's cavity will release smoke into the chicken, cooking it from the inside. In addition to cooking the food item simultaneously from the inside and the outside, the aroma and flavor of the smoke is imparted on both the inside and the outside of the food item.

Figure 8A:
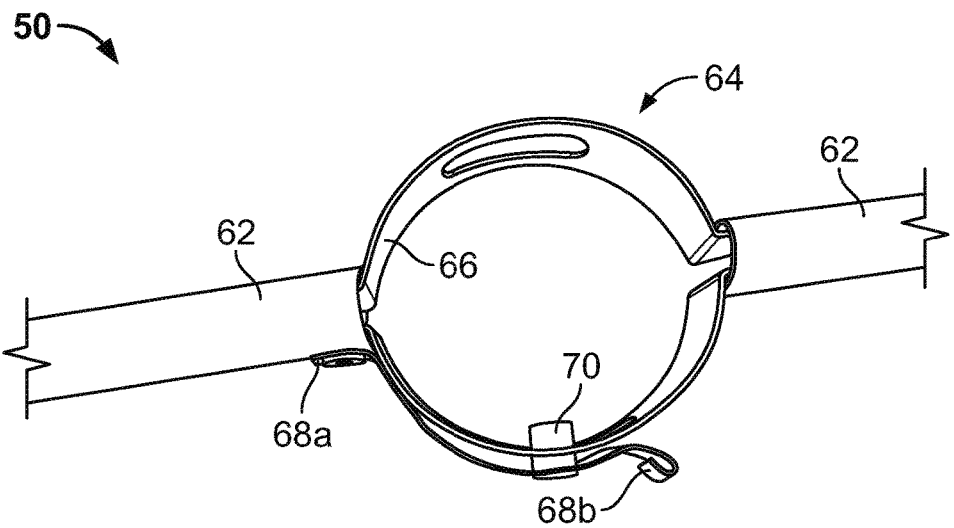
FIGS. 8A-B are close-up views of a movable support that may be used to support food on a perforated smoke stack, in accordance with an aspect of an embodiment of the present invention.
Figure 8B:
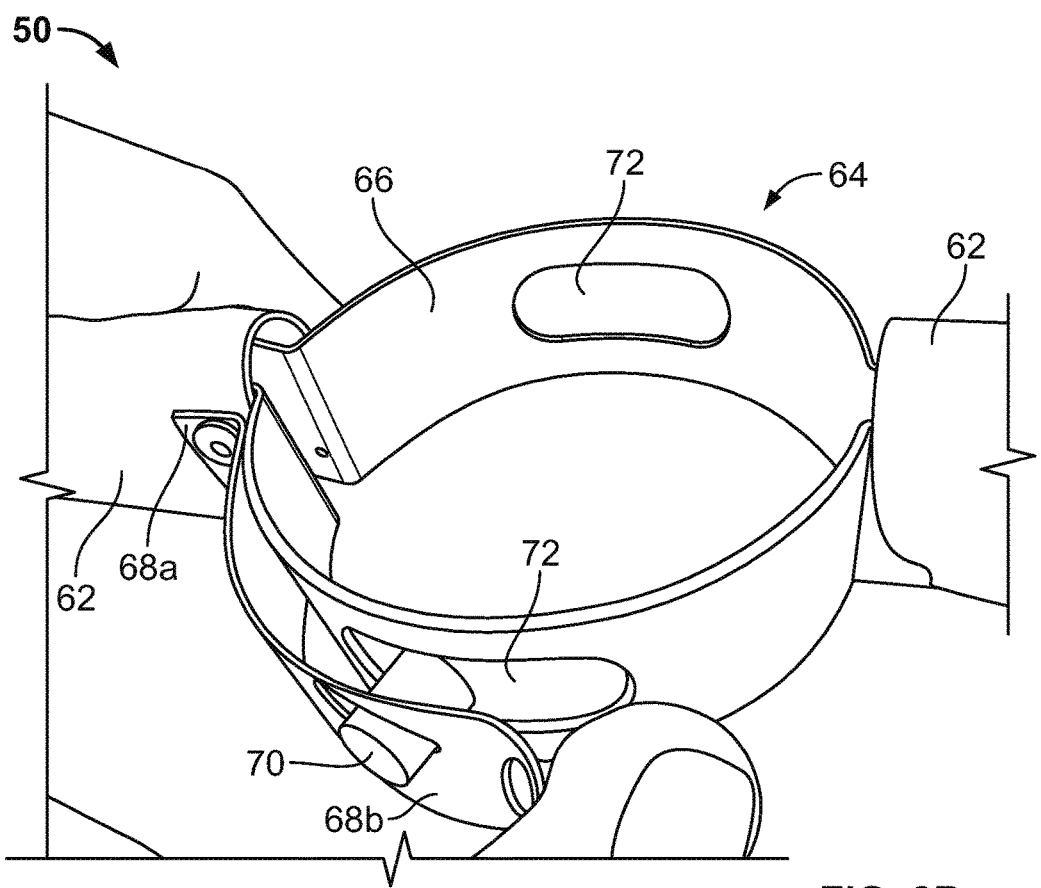

The anchor portion 64 is removable attached to the perforated smoke stack 32 so that the position of the adjustable support 50 can be moved up or down the perforated smoke stack 32. FIGS. 8A-B provide a close-up look at the adjustable support 50. The two support handles 62 are attached to a central anchor portion 64. The anchor portion 64 includes a ring 66 and a flexing arm 68. The ring 66 is shaped to fit closely over the perforated smoke stack 32. The flexing arm 68 can flex in or out to lock the adjustable support 50 into place along the perforated smoke stack 32. The flexing arm has a fixed end 68a and a flexing end 68b. Proximate the flexing end 68b, there is an insert 70 that is shaped to be inserted into a perforation 48 on the perforated smoke stack 32. Openings 72 on the ring 66 allow for the insert 70 to be flexed in and out of the ring 66. When the ring 66 is placed over the top of the perforated smoke stack 32, the insert 70 and flexing arm 66 are flexed outwardly so that the ring 66 is clear and movement up and down the perforated smoke stack 32 is uninhibited. When the perforated ring 66 is positioned at the desired height along the perforated smoke stack 32, the insert 70 is positioned over a perforation 48 at the desired height, thus allowing the flexing arm 66 to flex inwardly and for the insert 70 to be inserted into the perforation 48. Once the insert 70 has been inserted into a perforation 48, the adjustable support 50 is secured into that position and is able to support food.

Figure 9A:
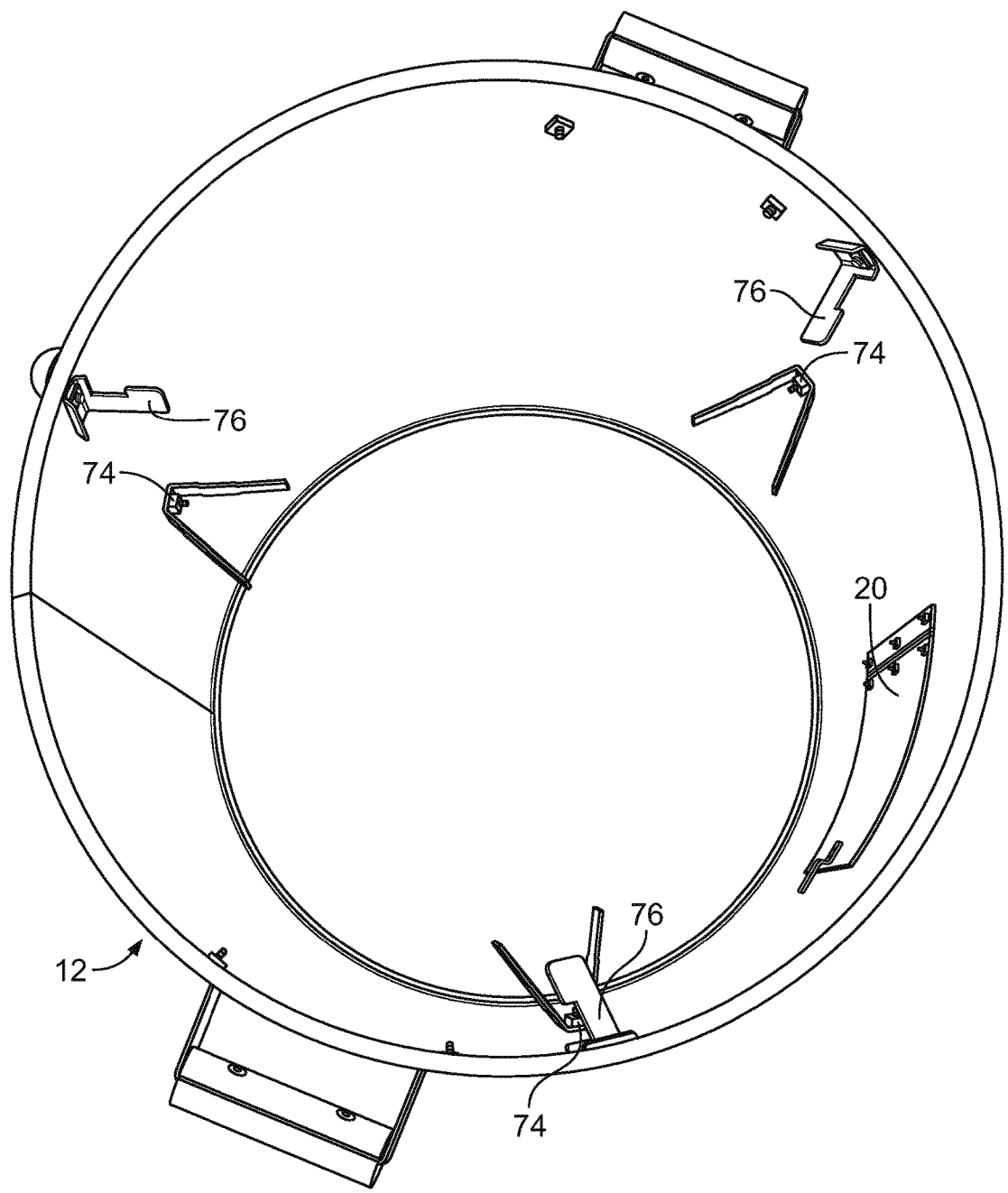
FIGS. 9A-B are top-down internal views of a smoker body in accordance with an aspect of an embodiment of the present invention.
Figure 9B:
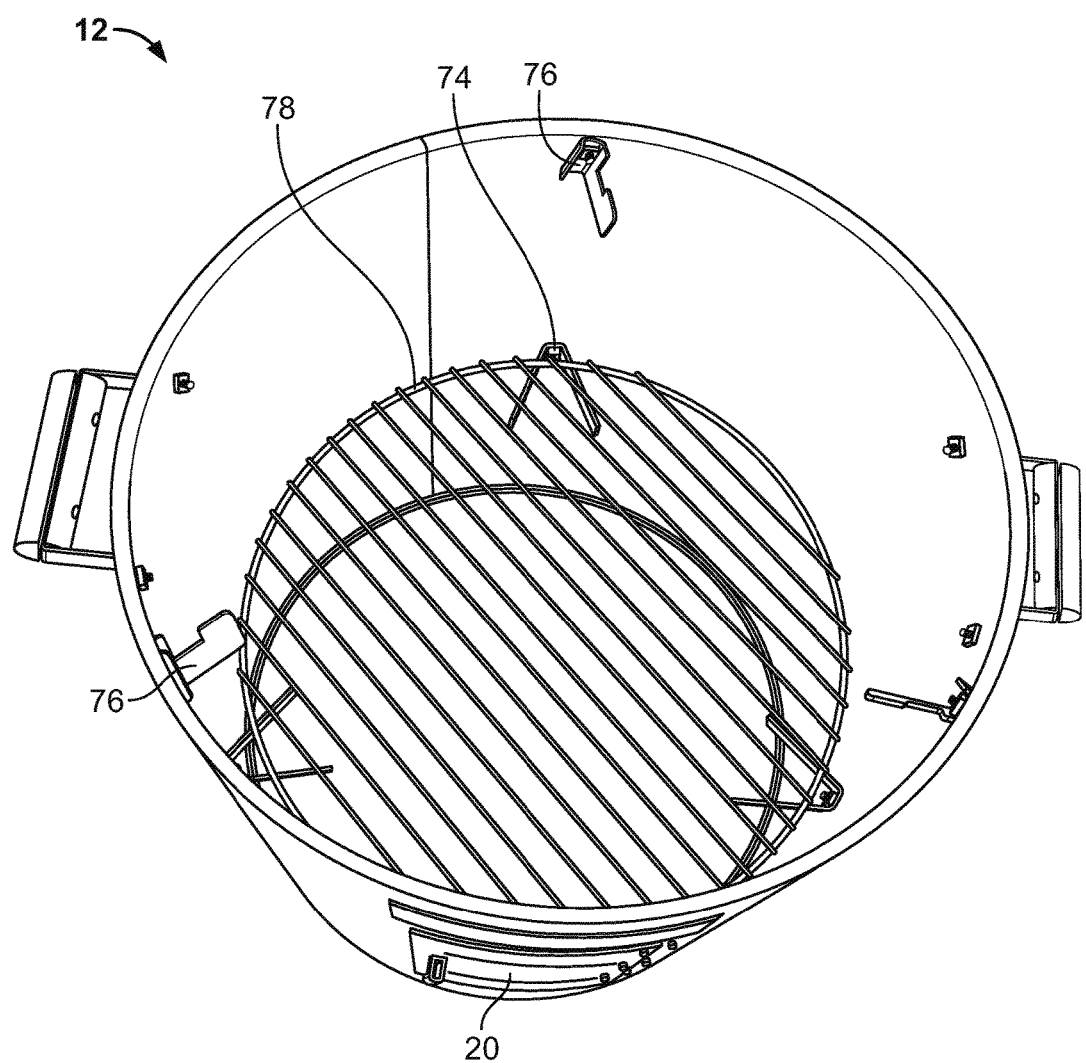

FIGS. 9A-B provides an internal view of the smoker's body 12. The body 12 includes a set of lower brackets 74 and a set of upper brackets 76. The brackets 74, 76 are configured to support grill grates 78, as shown in FIG. 9B. The grilling grates 78 may serve several purposes. First, circular grates, as shown in FIG. 9B, may be used when the perforated smoke stack 32 is not in use. In this configuration, the smoker 10 may be used as a traditional vertical water smoker, with items of food placed on the grates 78. The body 12 fills with smoke from the charcoal pan 26 and cooks the food. Also using circular grilling grates, the smoker 10 may be operated as a traditional charcoal grill. Charcoals may be placed directly on the lower grate 78 to cook foods on the upper grate (supported by upper brackets 76). Or the charcoal pan 26 may be removed from the base and placed on the lower grate 78 to cook foods on the upper grate.

Figure 10:
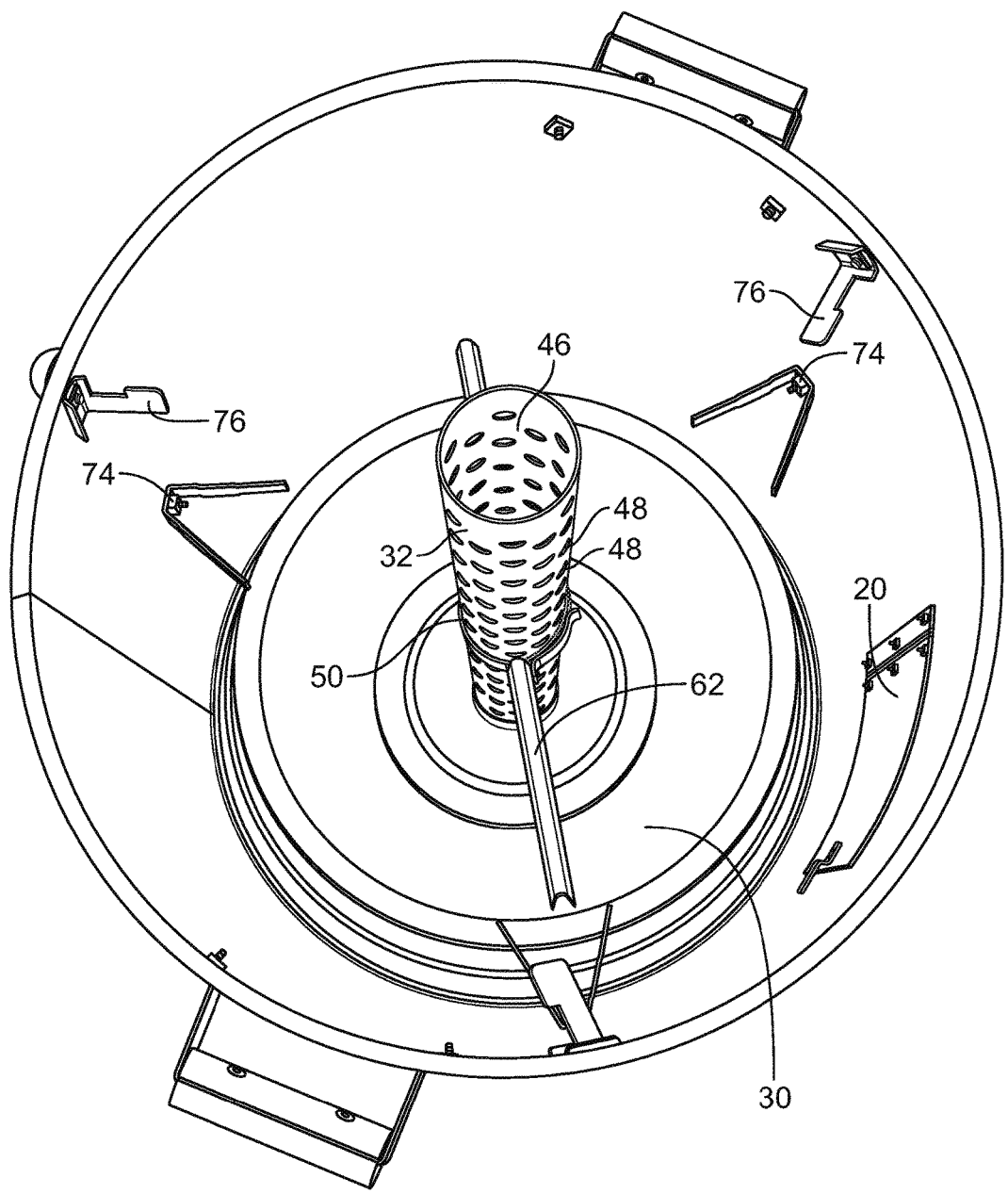
FIG. 10 is a top-down internal view of the base assembly and perforated smoke stack of FIG. 7 positioned inside the smoker body of FIG. 9.

In order to cook food from both the inside and outside simultaneously, as discussed above with the example of cooking a chicken, the perforated smoke stack 32 must be inserted, as shown in FIG. 10. However, in the configuration depicted in the figures, the perforated smoke stack 32 would not allow for the use of the full circular cooking grates 78. The grates 78 may be removed altogether, with the food supported solely by the perforated smoke stack 32 and the adjustable support 50. Alternatively, ring-shaped grates may be used with circular openings in the center of the grates so that the grates can be positioned around the perforated smoke stack 32 on the lower and upper brackets 74, 76. It should be evident that numerous configurations are possible using the components described above. For example, the adjustable support 50 may be lowered to the bottom of the perforated smoke stack 32 and support a small food item, and a ring-shaped grate positioned on the upper brackets 76 to support other food to be cooked. Or multiple food items may be stacked one on top of the other using only the adjustable support 50. Or a ring-shaped grate may be used to support both a food item skewered on the perforated smoke stack 32 with other food items placed on the outside of the ring-shaped grate. These are but a few examples of the configurations possible with the smoker components described herein.

Figure 11A:
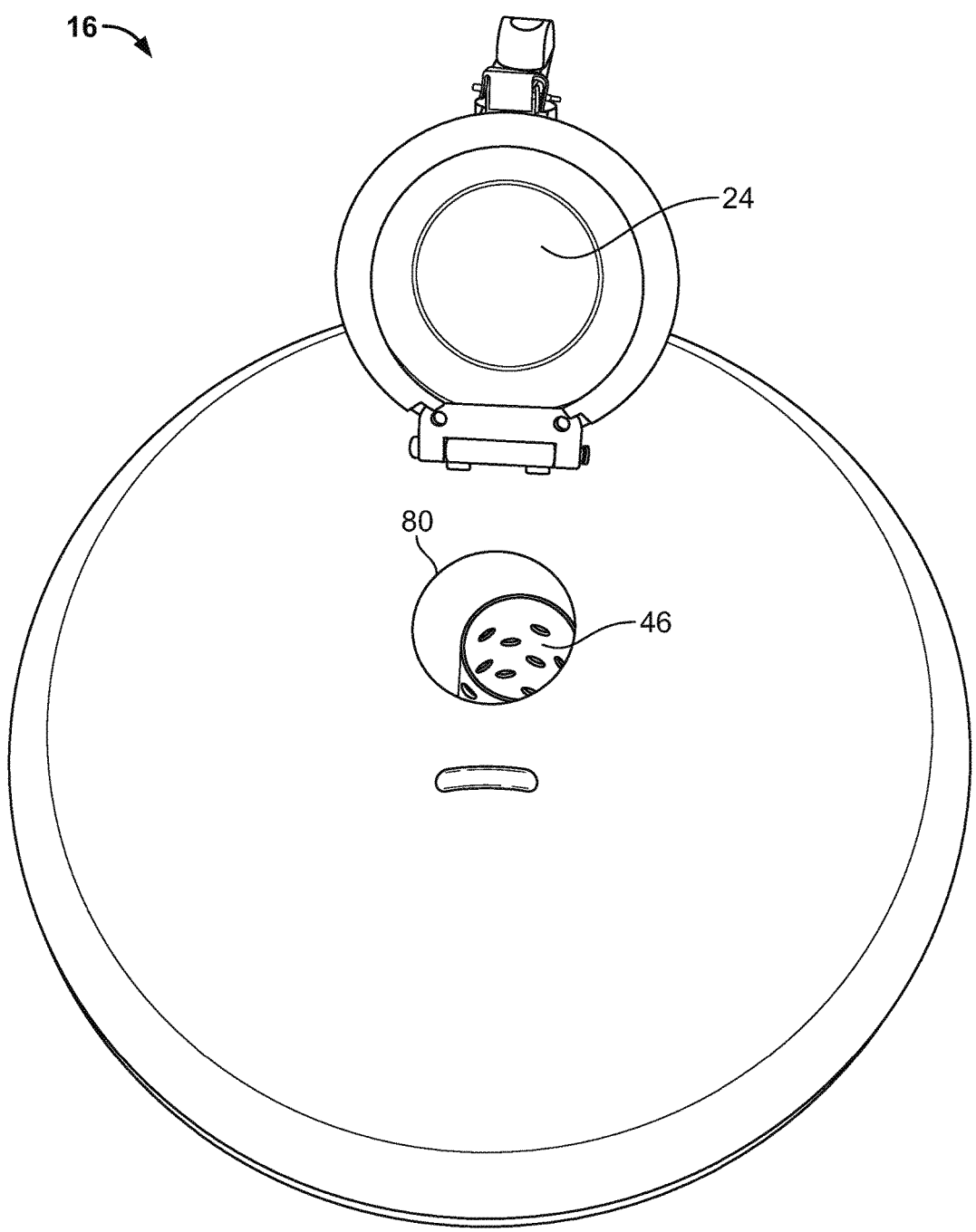
FIGS. 11A-C are assorted views of a smoker lid in accordance with an aspect of an embodiment of the present invention.
Figure 11C:
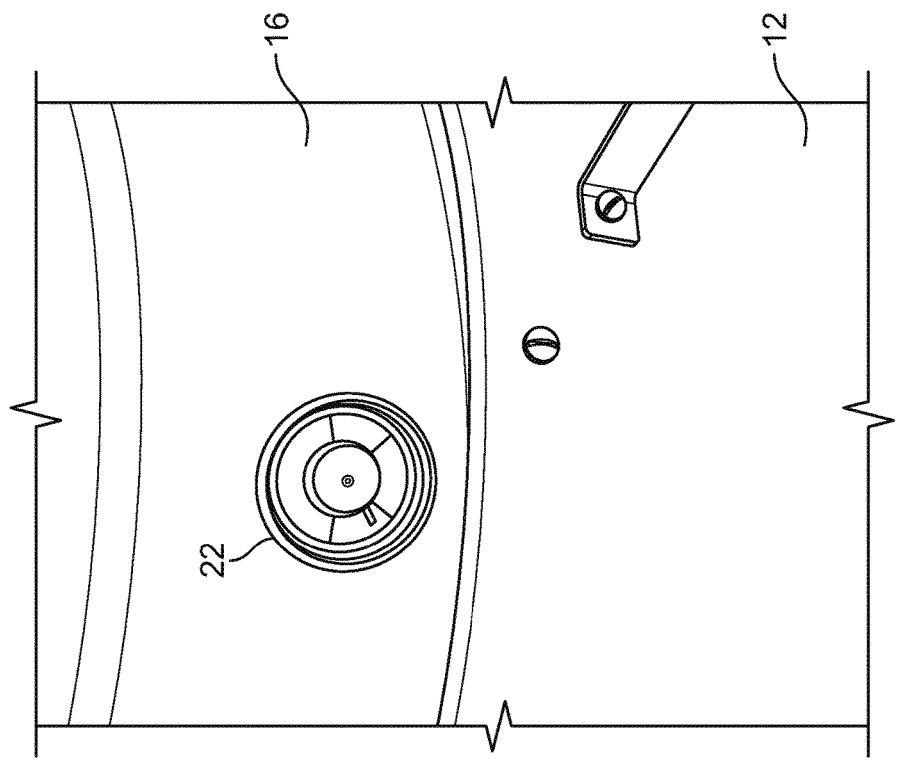
Figure 11B:
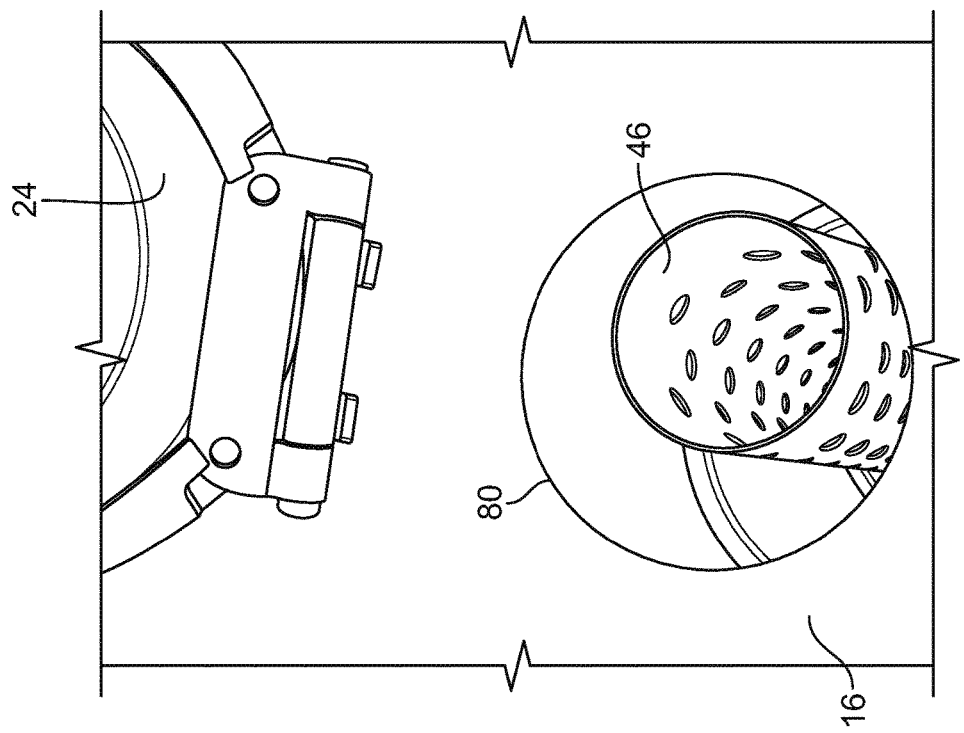

FIGS. 11A-C depict the lid 16 placed on top of the smoker body 12. The lid encloses the top of the body 12 to contain heat and smoke within the smoker 10. The lid 16 includes an opening 80 that is covered by a smoke release cap 24. The cap 24 may be opened to allow smoke to escape from the smoker 10, or closed to keep smoke trapped inside. The top opening 46 of the perforated smoke stack 32 extends so that it is positioned proximate the opening 80 so that smoke can escape through the top opening 46, out the opening 80. Alternatively, a removable piece may be provided to close the top opening 46 if a user wishes to prevent smoke from escaping out of the top opening 46 (thereby forcing more smoke out through the perforations 48). The smoke release cap 24 may also be used to add wood chips, charcoal, or other fuel of preference directly into the charcoal pan 26. As previously discussed, the bottom of the perforated smoke stack 32 opens directly into the charcoal pan 26. As such, a user can open the smoke release cap 24, and drop fuel through the opening 80, and into the top opening 46 of the perforated smoke stack 32, resulting in the fuel being deposited into the charcoal pan 26. The lid also includes a temperature indicator 22, which provides the user with an indication of the temperature inside the smoker 10.

In the foregoing specification, embodiments of the invention have been described with reference to specific exemplary features thereof. It will, however, be evident that various modifications and changes may be made thereto without departing from the broader spirit and scope of the invention. The specification and figures are, accordingly, to be regarded in an illustrative rather than a restrictive sense.

What is claimed is:

1. A smoker comprising:
   a combustion chamber configured to hold a fuel element;
   a pan cover configured to cover the combustion chamber;
   a cooking chamber heated by the combustion chamber, the cooking chamber being substantially enclosed;
   a perforated smoke stack disposed entirely within the cooking chamber and extending through the pan cover, the perforated smoke stack including an open proximal end and an open distal end, the open distal end being in direct communication with the combustion chamber so as to receive heat emanated from the combustion chamber, the perforated smoke stack having a plurality of perforations and shaped to be inserted through a food item, wherein the perforations are positioned in multiple columns and rows from the open proximal end towards the open distal end;
   an aperture positioned on a top surface of the cooking chamber, wherein the open proximal end of the perforated smoke stack is vertically aligned with the aperture positioned on the top surface of the cooking chamber.

2. The smoker of claim 1, the cooking chamber further comprising:
   a body, and
   a lid including the aperture positioned on the top surface of the cooking chamber;
   wherein a cap can be opened or closed, the cap in the closed position substantially obstructing the aperture positioned on the top surface of the cooking chamber; and
   wherein the open proximal end of the perforated smoke stack is level with the aperture positioned on the top surface of the cooking chamber allowing additional fuel elements to be deposited into the combustion chamber through the perforated smoke stack when the cap is in the open position.

3. The smoker of claim 2, further comprising a water pan located within the cooking chamber positioned over the combustion chamber, wherein the water pan includes a pass through aperture which the perforated smoke stack extends through.

4. The smoker of claim 1, wherein the fuel element is a solid fuel that creates smoke when ignited, and
the perforated smoke stack is in communication with the combustion chamber so as to be able to receive smoke emanating from the combustion chamber.

5. The smoker of claim 4, wherein the combustion chamber further comprises at least one vent, wherein the cooking chamber is in communication with the at least one vent of the combustion chamber so as to directly receive smoke emanating from the combustion chamber.

6. The smoker of claim 4, wherein the fuel element is charcoal.

7. A method for smoking food in a smoker, the smoker comprising:
a combustion chamber configured to hold a fuel element,
a pan cover covering the combustion chamber;
a cooking chamber heated by the combustion chamber, the cooking chamber substantially enclosed, and
a perforated smoke stack disposed within the cooking chamber, the perforated smoke stack including an open proximal end and an open distal end, and the open distal end of the perforated smoke stack being in direct communication with the combustion chamber so as to receive heat emanated from the combustion chamber and having a plurality of perforations, wherein the perforations are positioned in multiple columns and rows from the open proximal end towards the open distal end, the method comprising:
inserting the perforated smoke stack through a food item;
positioning the entirety of the perforated smoke stack and the food item within the cooking chamber such that the perforated smoke stack is in direct communication with the combustion chamber;
vertically aligning an aperture positioned on a top surface of the cooking chamber with the open proximal end of the perforated smoke; and
igniting a fuel element inside the combustion chamber to create heat,
the step of igniting the fuel element inside the combustion chamber causing the inside of the food item to be heated by heat emanating from the plurality of perforations in the perforated smoke stack.

8. The method of claim 7, wherein the fuel element is a solid fuel, and igniting the fuel element inside the combustion chamber results in smoking of the inside of the food item using smoke emanating from the plurality of perforations in the perforated smoke stack.

9. The smoker of claim 8, wherein the fuel element is charcoal.

* * * * *